United States Patent [19]

Yang

[11] Patent Number: 5,372,395
[45] Date of Patent: Dec. 13, 1994

[54] BATTERY COVER LOCKING APPARATUS

[75] Inventor: Jae S. Yang, Gunpo, Rep. of Korea

[73] Assignee: Goldstar Information & Communications, Ltd., Rep. of Korea

[21] Appl. No.: 39,640

[22] Filed: Mar. 30, 1993

[30] Foreign Application Priority Data

Mar. 31, 1992 [KR] Rep. of Korea .................. 92-5384

[51] Int. Cl.⁵ .............................................. H01M 2/10
[52] U.S. Cl. .................................. 292/147; 429/96; 429/100; 292/DIG. 38
[58] Field of Search ............... 292/203, 207, 208, 63, 292/64, 109, 106, 146, 147, 150, DIG. 38; 429/96, 97, 98, 100

[56] References Cited

U.S. PATENT DOCUMENTS

| | | | |
|---|---|---|---|
| 3,096,113 | 7/1963 | Polzin | 292/147 |
| 3,897,268 | 7/1975 | Haraguchi | 429/97 |
| 3,999,110 | 12/1976 | Ramstrom et al. | 429/96 |
| 4,146,682 | 3/1979 | Nakao | 429/97 |
| 4,863,812 | 9/1989 | Veda et al. | 429/100 |
| 5,172,520 | 12/1992 | Hostetler et al. | 292/207 |
| 5,202,197 | 4/1993 | Ansell et al. | 429/100 |
| 5,206,098 | 4/1993 | Cho et al. | 429/96 |

Primary Examiner—Peter M. Cuomo
Assistant Examiner—Darnell M. Boucher
Attorney, Agent, or Firm—Perman & Green

[57] ABSTRACT

An apparatus for locking a battery cover by which it is convenient to change a battery and by which the battery cover can be firmly locked. The apparatus comprises a body having a hinged portion and an engaged portion in its corner in which a battery housing is formed, a battery cover having a pair of slide pins disposed in the hinged portion of the body in order to be opened and closed, a pair of sliding guide members disposed in the hinged portion of the body in order for the slide pins to be right and left slidably received when she battery cover is opened and closed and a locking knob molded in the engaged portion of the body in order to latch and unlatch the battery cover, the locking knob being upwardly and downwardly movable. As the battery cover can be firmly latched, it is not separated from the body even if accidental impact, vibration or the like is given.

4 Claims, 5 Drawing Sheets 5,372,395

BATTERY COVER LOCKING APPARATUS

FIELD OF THE INVENTION

The present invention relates to an apparatus for locking a battery cover for portable electrical products, and more particularly to an apparatus by which it is convenient to change a battery and by which the battery cover can be firmly locked not to be separated from the body of a portable electrical product even if accidental impact, vibration or the like is given to the body.

DESCRIPTION OF THE PRIOR ART

In general, when changing a battery in the body of portable electrical products, for example portable radio receivers such as those commonly known as pagers, it is well known that, as shown in FIGS. 1 and 2, if a locking knob 2 moves into the released position and if a battery cover 3 is pushed, then the battery cover 3 with the locking knob 2 is separated from the body 1 of portable electrical products (see U.S. Pat. No. 4,390,198).

Further, it is also well known that, as shown in FIG. 3, a battery cover 4 can slide over a locking knob 5 in a direction shown by arrow B if the locking knob 5 slides in a direction shown by arrow A (see U.S. Pat. No. 4,880,712).

However, the former has the following problems: (1) the battery cover 3 and locking knob 2 are likely to be when the battery is changed; and (2) the locking force is so weak that the battery cover 3 is easily disengaged by the accidental impact, vibration or the like.

The latter also has the following problems: (1) the battery cover 4 is likely to be lost when the battery is changed; and (2) it is inconvenient to assemble and disassemble battery cover 4 with and from the body 6, respectively.

OBJECTS OF THE INVENTION

It is therefore an object of the present invention to provide an apparatus for locking a battery cover which is less likely to be lost or broken when a battery is changed.

It is another object of the present invention to provide an apparatus for locking a battery cover whose locking force is strong.

SUMMARY OF THE INVENTION

The present invention provides an apparatus for locking a battery cover comprising a body having a hinged portion and an engaged portion in its corner in which a battery housing is formed; a battery cover having a pair of slide pins disposed in the hinged portion of the body in order to be opened and closed; a pair of sliding guide members molded in the hinged portion of the body in order for the slide pins to be right and left slidably received when the battery cover is opened and closed; and a locking knob disposed in the engaged portion of the body in order to latch and unlatch the battery cover, the locking knob being upwardly and downwardly movable.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

Figure 1:
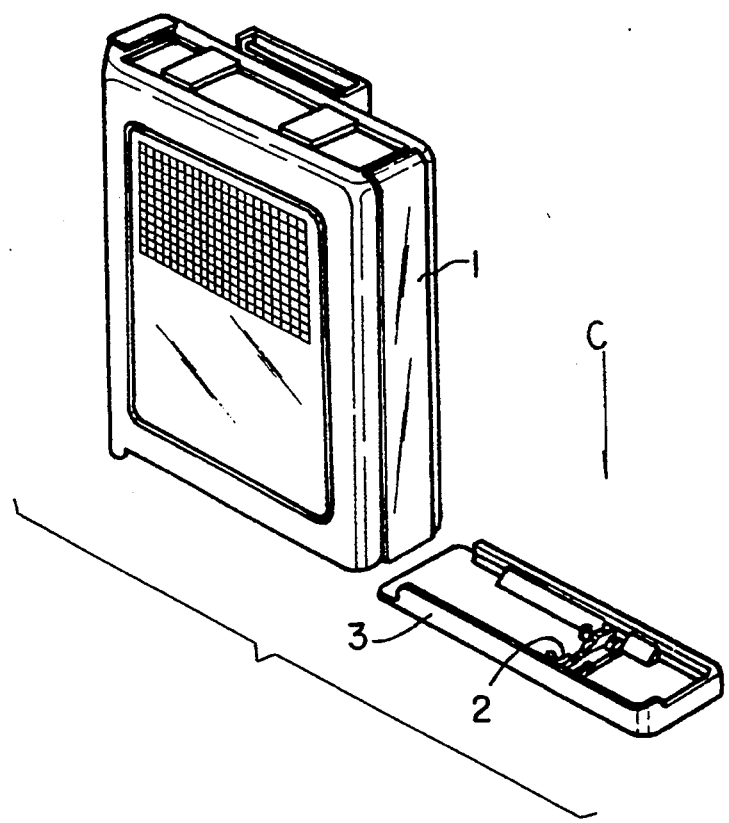
FIG. 1 is an exploded perspective view in accordance with an embodiment of prior art.
Figure 2:
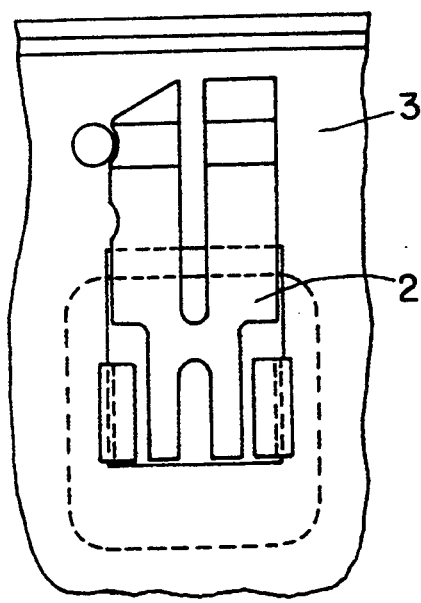
FIG. 2 is a detailed view along C of FIG. 1.
Figure 3:
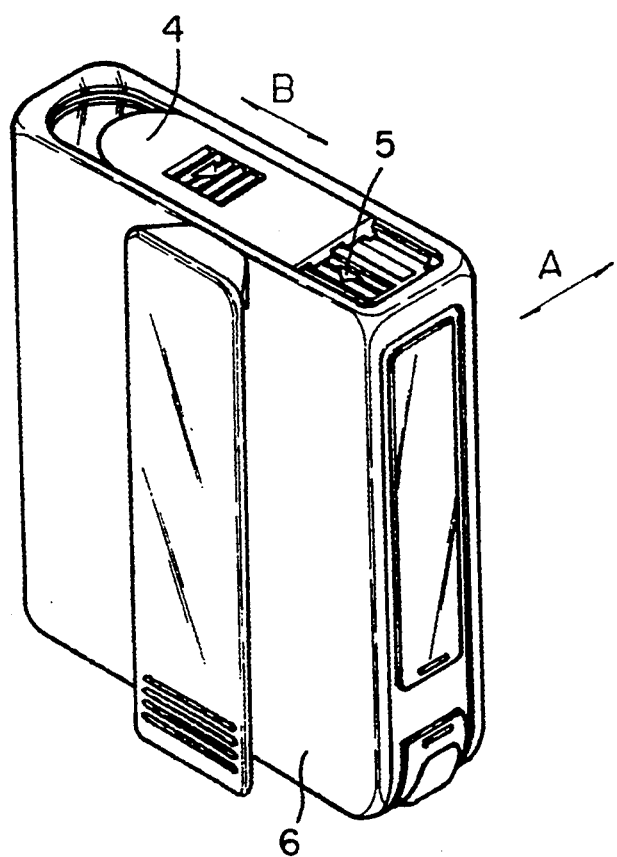
FIG. 3 illustrates another embodiment of prior art.
Figure 4:
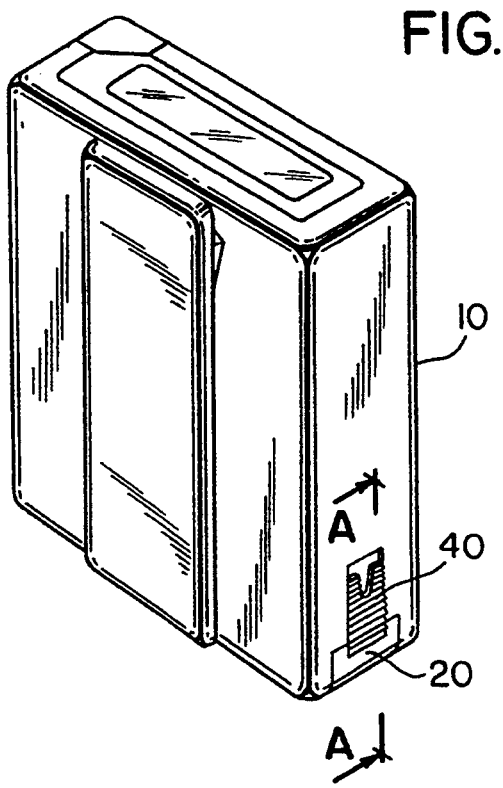
FIG. 4 is a perspective view showing the assembled condition of the present invention.

FIG. 4 shows a portable radio receiver such as a pager in accordance with the present invention, which comprises a body 10, a battery cover 20, a pair of sliding guide members 30 (FIG. 5) and a locking knob 40.

Figure 5:
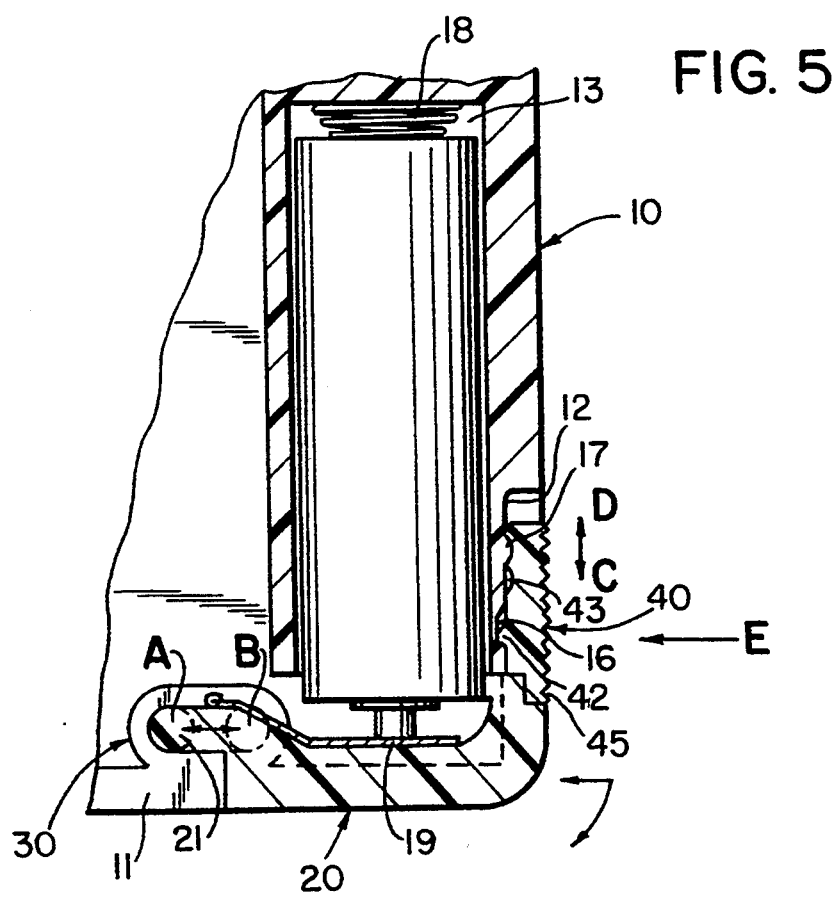
FIG. 5 is a sectional view taken along the line A—A' of FIG. 4.
Figure 6:
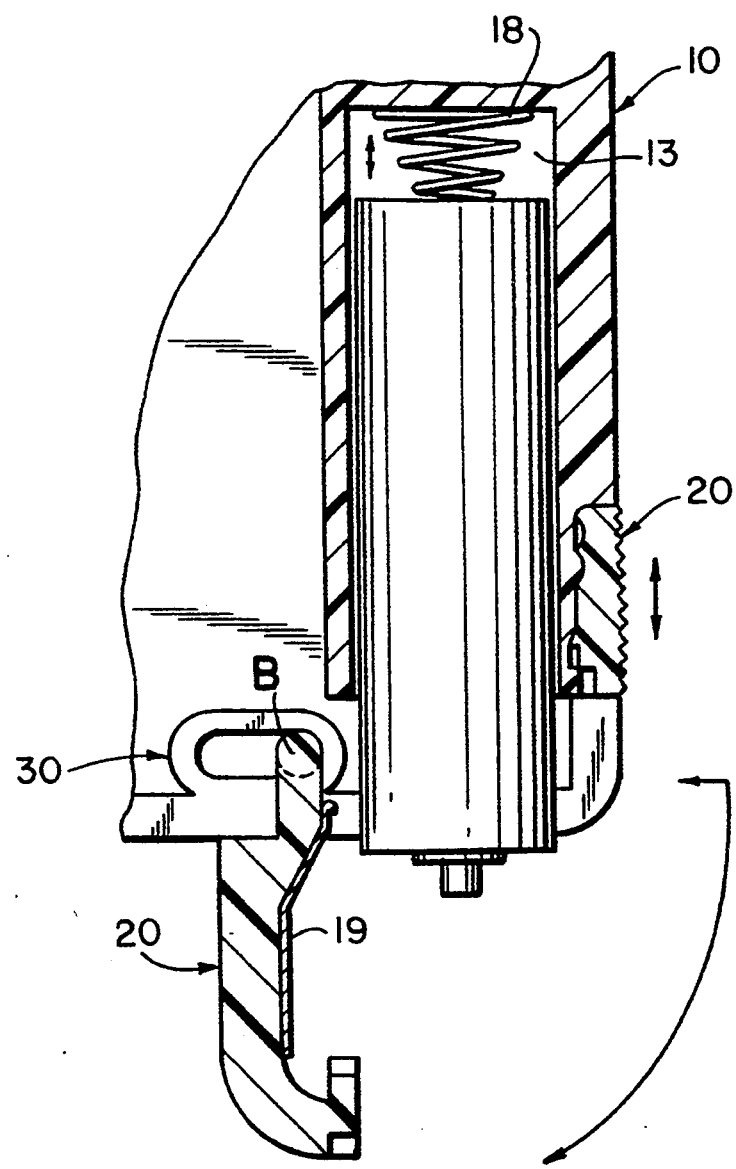
FIG. 6 is a view similar to FIG. 5 depicting the battery cover swung clockwise from the latched position.
Figure 7:
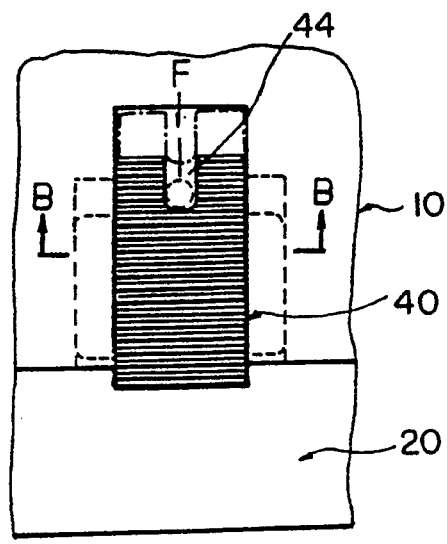
FIG. 7 is a detailed view of the locking knob 40 of FIG. 5.

Referring to FIG. 5, the body 10 has a hinged portion and an engaged portion 12 in its corner in which a battery housing 13 is formed. A battery is positioned within the battery housing 13, respective ends thereof are placed in electrical contact with terminals 18 and 19 to supply power to the electrical circuit (not shown) of the pager. Terminal 18 may be preferably a spring terminal fixed on the upper portion of the battery housing 13 and the terminal 19 may be embedded in the battery cover 20. The battery cover 20 has a pair of slide pins 21 disposed in the hinged portion 11 of the body 10 in order to be opened and closed within an angle of 90 degrees. The pair of sliding guide members 30 may be molded in the hinged portion 11 of the body 10 in order for the slide pins 21 to be right and left slidably received when the battery cover is opened and closed. The locking knob 40, which is upwardly and downwardly movable, is disposed in the engaged portion 12 of the body 10 in order to latch and unlatch the battery cover FIGS. 5 and 6 show more in detail the engagement and disengagement stages of the battery cover 20 with the locking knob 40, respectively. The locking knob 40 has a knob-hooking projection 42 and two semi-spherical grooves 43 on its inner side, a locking groove 44 (FIG. 7) on its upper side, and a cover-hooking projection 45 on its lower side. The knob-hooking projection 42, the semi-spherical grooves 43 and the locking groove 44 may be in gear with a knob-hooking projection groove 16 and a semi-spherical projection 17 formed in the engaged portion 12 of the body 10, respectively.

Figure 8:
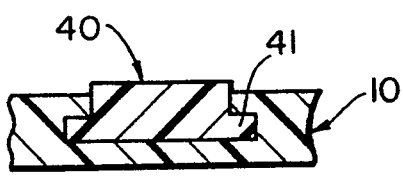
FIG. 8 is a sectional view taken along the line B—B of FIG. 7.

Further, the locking knob 40 has a pair of guide fins 41 on both sides of its inner side. The guide fins 41 are inserted into and then guided along a pair of guide grooves 15 formed the engaged portion 12 of the body 10 (FIG. 8).

Figure 9:
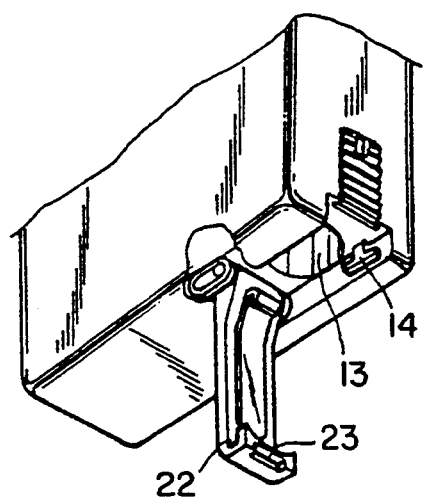
FIG. 9 is a perspective view showing the operating condition in accordance with the present invention.

FIG. 9 shows the opened condition of the battery cover 20, which includes a pair of hooking grooves 22 on both sides of its tip end. The hooking grooves 22 may be in gear with a pant of cover-hooking jaws 14 formed in the engaged portion 12 of the body 10. Further, a knob groove 23 on the tip end of the battery cover 20 may be in gear with the cover-hooking projection 45.

The operation of the present invention as described above is as follows:

If the locking knob 40 is pushed in a direction shown arrow D of FIG. 5, the cover-hooking projection 45 is disengaged from the battery cover 20. At this time, as best shown in FIG. 8, the guide fins 41 of the locking knob 40 will be guided and slided along the guide grooves 15 of the body 10 as well as the knob-hooking projection 42 will be guided and slided along the knob-hooking projection groove 16. The semi-spherical projection 17 is engaged into the semi-spherical groove 43 at the released position F of FIG. 7. As a result, the knob-hooking groove 23 of the battery cover 20 will be disengaged with the projection 45 of the locking knob 40. Then, if the battery cover 20 is pushed into the right of FIG. 5, the slide pins 21 will be moved from the latched position A of FIG. 5 within the sliding guide members 30 to the released position B of FIG. 5. Accordingly, the battery cover 20 may be rotated within an of 90 degrees around the slide pins 21 placed in the position B of FIG. 6 and then it may be opened. At this time, the battery may be downwardly projected due to the elasticity of the spring terminal 18.

If the battery cover 20 is rotated in the opposite direction and is pushed into the latched position A of FIG. 5, the slide pins 21 will be moved from the released position B within the sliding guide members 30 to the latched position A of FIG. 5, the hooking grooves 22 of the battery cover 20 will be engaged into the cover-hooking jaws 14 of the body 10, and the battery cover 20 will be closed. Then, if the locking knob 40 is pushed in a direction shown by arrow C of FIG. 5, the tip end of the knob-hooking groove 23 of the battery cover 20 will be engaged with the cover-hooking projection 45 of the locking knob 40, and the knob-hooking projection 42 which is formed in the inner side of the locking knob 40 will be guided into and engaged with the knob-hooking projection groove 16 of the body 10. The semi-spherical projection 17 of the body 10 is released from the semi-spherical grooves 43 and engaged with the locking groove 44 formed in the upper side of the locking knob 40 as shown in a solid line of FIG. 7. Therefore, the locking knob 40 is stopped at the latched position and as a result, it is engaged with the battery cover 20. As described above, according to the present invention, the opening operation of the battery cover is rotatable within an angle of 90 degrees in changing the battery. Thus, the battery housing of the portable electrical products may be fully exposed and as a result, it is convenient to change the battery. Moreover, as the battery cover can be firmly latched, it is not separated from the body of the portable electrical products even if accidental impact, vibration or the like is given.

While there has been described a preferred form of the present invention, obviously modifications and variations are possible in light of the above teachings. It is therefore to be understood that within the scope of the appended claims, the present invention may be practiced otherwise than as specification described.

What is claimed is:

1. A battery cover lock comprising
   a body having a hinged portion and an engaged portion in its corner in which a battery housing is formed;
   a battery cover having a pair of slide pins disposed in the hinged portion of said body in order to be opened and closed;
   a pair of sliding guide members molded in the hinged portion of said body in order for said slide pins to be right and left slidably received when the battery cover is opened and closed enabling translational movement said cover in a first plane between first and second positions and enabling pivotal movement of said cover about said slide pins when said cover is at the second position; and
   a locking knob disposed in the engaged portion of said body, said locking knob being upwardly and downwardly movable in a second plane transverse of said first plane between a latched position lockingly engaged with said battery cover and an unlatched position disengaged from said battery cover.

2. A battery cover lock as claimed in claim 1, wherein said battery cover includes a pair of hooking grooves on both sides of its tip end and said body includes a pair of cover-hooking jaws engageable with said hooking grooves when said battery cover is in said first position.

3. A battery cover lock as claimed in claim 1, wherein said locking knob includes a pair of guide fins on both sides of its inner side and the engaged portion of said body includes a pair of guide grooves into which said guide fins are inserted and then guided therealong as said locking knob moves between said latched and unlatched positions.

4. A battery cover lock as claimed in claim 1, wherein said locking knob includes a knob-hooking projection and a plurality of semi-spherical grooves on its inner side, a locking groove on its upper side and a cover-hooking projection on its lower side, the engaged portion of said body includes a knob-hooking projection groove and a semi-spherical projection engageable with said knob-hooking projection, semi-spherical grooves and locking groove, and said battery cover includes knob grooves engageable with said cover-hooking projection on its tip end.

* * * * *